Patented Mar. 13, 1951

2,544,693

UNITED STATES PATENT OFFICE 2,544,693

ULTRAMARINE AND PROCESS FOR MAKING SAME

Charles A. Kumins, Tuckahoe, N. Y., assignor to Interchemical Corporation, New York, N. Y., a corporation of Ohio No Drawing. Application October 8, 1947, Serial No. 778,729

15 Claims. (Cl. 106—305)

This invention relates to ultramarine blue and aims to provide a new and economical method for its production.

Ultramarine blue is a sulfur containing sodium aluminum silicate having a crystal structure closely resembling that of the zeolites. The blue color is attributed to the presence of sulfur complexes in the crystal lattice. It is widely used as a blue pigment in paints, inks, paper, etc.

Ultramarine blue is produced commercially by calcining, under various conditions and in various types of apparatus, an intimate mixture of china clay with about an equal weight of sodium carbonate and/or sodium sulfate and sulfur and with a small amount of carbonaceous material such as pitch, rosin or charcoal. A small amount of silica is also sometimes included in the mixture. The ingredients and proportions are often varied in order to obtain products having different properties. For example, when sodium sulfate with no sodium carbonate is used, a weak, greenish product which is low in hiding power and poor in acid resistance is obtained, and when sodium carbonate with no sodium sulfate is used, together with some silica and a high percentage of sulfur, a dark, reddish-blue product with improved hiding power and acid resistance is obtained.

In one method the mixture is calcined, with exclusion of air, in covered, cylindrical or tapered fireclay or other refractory crucibles placed one upon another in a muffle or shaft furnace, for from 7 to 10 hours, at a temperature "between red and white heat." This operation produces green ultramarine. The exact weight and temperature of the calcination depend upon the ingredients and the proportions of ingredients, the size and shape of the crucibles, the dimensions of the furnace, etc. At the end of the calcination the furnace is allowed to cool, which process generally takes from 2 to 3 days. The crucibles are then removed and the fused ultramarine green is crushed and dry-milled in revolving barrels, ball mills, cone mills or pulverizers, etc., and screened to remove coarse particles. The ultramarine green is then intimately mixed with from about 7% to 10% of finely ground sulfur and roasted at "a medium red to a bright red heat" in a muffle, retort, cylindrical or other type furnace. The sulfur, instead of being preliminarily mixed with the ultramarine green, may be added intermittently during the roasting operation. It melts and burns as air is admitted, sulfur dioxide is formed and escapes, and the green color gradually changes to blue. The roasting operation takes 2 or 3 days, or longer. The roasted blue product is finally lixiviated to remove soluble salts, wet-milled, dried and dry-milled.

In another method, often called the direct process, the mixture is calcined, with some admission of air, either in covered crucibles or pots, placed one upon another in a muffle furnace, or simply spread upon the floor of the muffle. When operating according to this method the furnace is slowly heated to about 800° C. and maintained at this temperature until a withdrawn test sample indicates that the operation is finished. The furnace is then closed and allowed to cool. The heating period usually extends over from 24 to 36 hours and the cooling period usually extends over from 6 to 8 days.

These methods have certain inherent disadvantages. They are very time-consuming, often requiring from 10 to 14 days, or longer, to obtain the finished product, and they are difficult to control. They result in the formation of hard, fused masses. In both methods the process includes the formation of a zeolite by fusing china clay with sodium carbonate and/or sodium sulfate, the simultaneous formation of sodium polysulfide by reaction of sulfur and sodium carbonate and/or sodium sulfate under reducing conditions, and the simultaneous reaction of the zeolite with polysulfide. At this high temperature of formation of zeolite the structure is compacted and less susceptible to the entrance of the rather large polysulfide linkage into the crystal lattice. The polysulfide formation reaction is an equilibrium one and excess sulfur is required for the formation of the desirable higher polysulfides, $Na_2S_3$, $Na_2S_4$ etc. Under the high temperature conditions of the operation required for the reduction of sodium carbonate and/or sodium sulfate, these higher sulfur content polysulfides may not form, due to the loss of sulfur by volatilization. It is believed that the intensity of blue color and tinting strength of the pigment depend at least in part upon the amount of sulfur carried into the crystal lattice by the sodium, and that therefore the formation of higher polysulfides is extremely important.

Thus in the known process three reactions take place simultaneously under conditions unfavorable to each.

I have now discovered that a superior product may be obtained by mixing zeolite or a compound yielding zeolite at the reaction temperature with sulfur and an organic salt of an alkali metal. While I have not found any of these salts that are not useful, the lower molecular weight sodium salts are particularly suitable because of their availability at low cost and the high color strength of the resultant product. I find especially good results are obtained with the acetate, oxalate, citrate and propionate. I then heat the mixture with exclusion of air at temperatures above 600° C. preferably from 750° C. to 900° C. for a period of 20 minutes to 3 hours. This period is not critical but a definite time period of moderate duration is required. No advantage is to be gained from extending the heating period.

Thereafter I continue the heating under oxidizing conditions either by the admission of air or an oxidizing gas, such as sulfur dioxide or nitric oxide or both. The temperature may be held as high as during the first stage or it can be dropped to a lower temperature even as low as 475° C. although best results are obtained in the range of 500° C. to 600° C. Oxidation is continued for 30 minutes to 3 hours and the resultant product may then be cooled, either slowly or by quenching.

It is my belief that the use of organic sodium salts avoids excessive alkalinity at all stages of the reaction, such as occurs in the known process in which sodium carbonate is used, and also when sodium polysulfide is used. A much softer and higher strength product is thereby obtained. The organic sodium compound decomposes at or near the boiling point of sulfur and during the decomposition the sodium combines with the sulfur to form extremely small sodium polysulfide particles in intimate association with the zeolite. The complete absence of caustic alkali entirely avoids fusion. My product, as discharged from the calcining furnace or kiln, consists of small aggregates having an arithmetical mean particle diameter of about 3 to 5 microns, and upon washing free of water-soluble salts may be immediately discharged into a wet milling system without prior crushing. Since the sodium polysulfide is formed while most or all of the sulfur is still present in the mixture, due to the low temperature, the probability of higher polysulfides formation is very great, whereas in the known sodium carbonate or sodium sulfate process the sodium polysulfide is formed at or near the fusion point of the sodium carbonate or sodium sulfate, at which temperature most of the sulfur vapor passes rapidly out of the mixture. The sodium polysulfide as it forms enters rapidly into reaction with the zeolite and the desired product is thus produced in a very short time.

It will be noted that a preferred embodiment of my invention contemplates that the temperature of oxidation is much lower than that of the known process. It is known that the conversion of ultramarine green to ultramarine blue is accompanied by the removal of sodium oxide as sodium sulfate. It is also known that sulfur dioxide is oxidized most efficiently at a temperature of about 400° C. to 500° C. Apparently it has not heretofore been known that ultramarine green is converted to ultramarine blue most efficiently and in a shorter time at the relatively low temperature which I use. It is my belief that the sodium sulfate is formed by the reaction of sulfur trioxide with that part of the sodium oxide which is held rather loosely on the surface of the crystal lattice, and that this sodium sulfate formation and the accompanying oxidation of green ultramarine to ultramarine blue take place most readily at the temperature most suitable for the oxidation of sulfur dioxide to sulfur trioxide, at which temperature the sulfur trioxide concentration is highest.

My calcination process may be carried out in various ways and in various types of equipment. I may employ covered crucibles in muffle furnaces, I may spread the material on the floor of a muffle furnace, or I may use a batch rotary kiln or continuous type rotary kilns. If desired, the greenish product may be quenched in water, washed and dried before the oxidation calcination, or it may be, and preferably is, oxidized without removing from the furnace.

As indicated, one of my starting materials is zeolite. This may be a natural zeolite but I prefer to control the quality of the finished product by the employment of synthetic zeolite as indicated in some of the examples that follow later. Equivalent results may be obtained by the use of other reagents yielding zeolites under high temperature conditions. Thus, I have produced ultramarine of great tinting strength from mixtures of sodium aluminate and silica or china clay. In the latter case, especially good results are had by first calcining the clay and then digesting it with caustic.

A further feature of my invention is the addition of a small amount of polar-non-polar compound, such as sodium resinate, the sodium salt of lignin sulfonic acid or a soap during the mixing of the zeolite, sulfur and organic sodium salt. This small addition of resinous material or soap prevents packing and also facilitates obtaining a uniform mixture of the ingredients. Besides its function of promoting mixing, this addition agent may be treated as part of the organic salt. However, if more than a few percent are added, the amount of carbon supplied compared with sodium will be excessive and additional sulfur must then be supplied sufficient to combine with the carbon to form carbon disulfide which readily passes out of the reaction zone.

My new product is characterized by fine particles of uniform color, easy grinding in paint, lacquer and ink vehicles, high tinting strength and clean reddish-blue color. It is much less abrasive than the present commercial grades of ultramarine blue. Consequently, the plate wear of printing inks made with my product is much less. The tinting strength is 15% to 80% greater than that of present commercial grades of ultramarine blue. This high tinting strength, together with the clean, reddish-blue color, permits the use of my new product in compositions in which ultramarine blue has not hitherto been used.

Ultramarine blue made in accordance with my invention after cooling, is washed and ground. The arithmetical mean particle diameter range ($d_1$) as determined by examination of electron micrographs ranges in various samples from .07 to .09 micron. The best available commercial products range from .09 to .14 micron. The specific gravity of my product and that of the available products does not differ significantly.

The "average particle diameter" most useful in pigment studies is the "$d_3$," which is related in a simple manner to the specific surface of the pigment, and hence to its hiding power and tinting strength. The relation of $d_3$ to specific surface is expressed in the following equation:

$$d_3 = \frac{6}{\rho S}$$

$S$ = specific surface
$\rho$ = density

The diameter $d_3$ is computed by dividing the second (or surface) moment into the third (or volume) moment; that is, the frequency ($n$) with which each size occurs is multiplied by the square of its particle diameter, and all such expressions are summed; then the frequency of each size is multiplied by the cube of the diameter, and the products are summed; finally the first sum is divided into the second to give the $d_3$. Symbolically this calculation is expressed as follows:

$$d_3 = \frac{\Sigma nd^3}{\Sigma nd^2}$$

Calculations made from extensive examinations of enlarged electron micrographs show my pigment to have a $d_3$ value of 0.39 micron and presently available commercial ultramarines to have a $d_3$ value of 0.51 to 0.55 micron.

Values of $d_3$ were also obtained by surface adsorption employing the methods described by P. H. Emmett and S. Brunauer in Jour. Am. Chem. Soc., 59:1553 and 2682 (1937); S. Braunauer, P. H. Emmett and E. Teller, Jour. Am. Chem. Soc., 60:390, (1938) (the B. E. T. method) and W. D. Harkins and G. Jura, Jour. Am. Chem. Soc., 66:1366 (1944), (the H. J. method). Data obtained by adsorption methods do not always check with data obtained by optical or electro-optical methods but the relative values obtained by both methods have been found to be consistent. Values of $d_3$ obtained with nitrogen by the B. E. T. and H. J. methods were 0.130 and 0.122 micron respectively and 0.221 and 0.222 respectively for one commercial standard, and 0.163 and 0.144 respectively for another commercial standard.

I have observed that presently available commercial ultramarine pigments contain large numbers of particles of colorless material while my product contains a much smaller number. These particles are chips of some material having a conchoidal fracture just as ultramarine, hence when particles are reduced to the same dimensional range as ultramarine particles, both will be of the same general shape. As the electron microscope does not distinguish between colors and, since the particles are of the same general shape, examination under the electron microscope fails to give any measure of the amount of this contaminating material. Taken in blue light of wavelength 435.8 millimicrons, the refractive index of ultramarine blue is 1.556 ± .002 while the index of the colorless material ranges from 1.48 to greater than 1.60.

If a sample is immersed in a liquid of refractive index 1.55 (in blue light of wavelength 435.8 millimicrons) and examined under the light microscope, under dark-field conditions, using white light as the source of illumination the ultramarine particles appear orange-red, and the colorless material appears white to bluish-white. Under such conditions, using a cardioid condenser, a 2 mm. oil immersion objective, and a 10x eyepiece, the resolving power of the light microscope is increased beyond 0.25 micron. Particles much smaller are detected clearly as diffraction discs.

Such an examination was made of both my new products and typical commercial products. The results of this examination indicate that my product contains far fewer white particles than the commercial materials. Samples of the best commercial materials available at present were examined and found to contain about 14% by weight of white particles, while the highest percentage found in any of my lots is 5.5.

The refractive index of the white materials present in the ultramarine was determined by immersing the ultramarine pigment in liquids of different refractive indices and comparing them with the pigment under the light microscope. The refractive indices of the immersion liquids were checked with the Abbe refractometer. The white material is composed of different inorganic materials which range in refractive index from about 1.60 to 1.46.

Tinting strength is defined by the ASTM as "the power of coloring a given quantity of paint or pigment selected as a medium standard for estimating such power."

Tinting strength measurements were carried out in accordance with the ASTM standard method D 387–36. 4.00 grams of the pigment were mulled with 1.91 grams of "O" litho varnish. A standard reduction paste was made with zinc oxide, 80 parts by weight, and "O" litho varnish, 20 parts by weight. The "Green Seal" brand of zinc oxide, a recognized standard for this purpose, was used.

Varying amounts of the color pastes were mixed with 10.00 grams of the standard reduction paste and the sample and reference standard mixes were drawn down in juxtaposition, in accordance with the ASTM method.

By this method, sample A, made in accordance with one modification of my invention, showed a tinting strength of 115, and sample B, made in accordance with another modification of my invention, showed a tinting strength of 162, based on the best commercial ultramarine blue available at present arbitrarily rated at 100.

It is significant that prolonged milling of my product yields an increase of tinting strength up to 50% or more while commercial pigments yield no more than 10%. This suggests that my pigment has greater inherent color value than known products.

In order to check these values accurately, spectrophotometric evaluations were made, using the Hardy design recording spectrophotometer made by General Electric Company. It is considered that two samples having essentially the same spectral characteristics are equal in tinting strength when they have the same percent reflectance at the wavelength of maximum absorption. If a chromatic pigment is added to white, the two-color mixture will exhibit selective absorption, which is the result of the chromatic color only, and the degree of selectivity depends upon the coloring power and the amount of the chromatic color. This selectivity is exhibited over a wide wavelength region, but the maximum absorption occurs at only one wavelength and is an inherent specific characteristic for each pigment. From this reasoning it is evident that when samples of two colored pigments having essentially the same chemical composition are separately mixed with the same amount of white, and the reflectance of the two mixtures is the same at the wavelength of maximum absorption, the two colored pigments are equal in tinting strength. The tinting strength of a colored pigment is directly proportional to the amount of the colored pigment required, when mixed with the same amount of white as the standard colored pigment, to equal the reflectance of the standard mix at the wavelength of maximum absorption. The less colored pigment required, the higher it is in tinting strength.

In accordance with the ASTM method, when 0.5 gram of standard ultramarine blue ink, prepared from the best available commercial material, is mixed with 10 grams of the specified white reduction paste, the wavelength of maximum absorption is 605 millimicrons, and at 605 millimicrons the reflectance is 21.7%.

Sample A, made in accordance with my invention, required but 0.435 gram to give 21.7% reflectance at the wavelength of maximum absorption of 605 millimicrons, and sample B, made in accordance with my invention, required only 0.307 gram. These values correspond to tinting strengths of 115% and 162% respectively, based on the best available commercial material arbitrarily set at 100%.

When the color pastes were mixed with the white standard reduction paste in the proportion of 0.50 gram color paste to 10.00 grams standard reduction paste, sample A showed a reflectance of 19.8%, sample B a reflectance of 16.8% and the standard a reflectance of 21.7% at the maximum absorption wavelength of 605 millimicrons.

For these same mixes of samples A and B and the standard, the reflectance was 78.6% for the standard, 79.6% for sample A, and 78.6% for sample B, at the maximum reflectance wavelength of 450 millimicrons. The difference between the percent reflectance at the wavelength of maximum reflectance and the percent reflectance at the wavelength of maximum absorption is an indication of the purity of a color. From the above data it will be noted that the difference in these reflectances is greater in the case of samples A and B than in the case of the standard. Samples A and B therefore have greater purity and are cleaner colors than the standard.

Example 1 gives a method for preparing artificial zeolite.

The remaining examples give methods for preparing ultramarine blue.

Example 1

A solution of 250 pounds of "N grade" sodium silicate, containing 72 pounds of silica ($SiO_2$) in 100 gallons of water at 60° C., is slowly added to a solution of 75 pounds of 90% sodium aluminate ($Na_2Al_2O_4$) in 100 gallons of water, also at 60° C., while stirring continuously. The resulting zeolite is filtered, washed substantially free of sodium hydroxide and dried at 110° C.

Example 2

Fifty-five pounds of the zeolite of Example 1, 15 pounds of anhydrous finely ground sodium acetate, 78 pounds of finely ground elemental sulfur and 1.5 pounds of sodium resinate are mixed in a porcelain ball mill for about 3 hours and then charged into a muffle furnace at a temperature of about 500° C. The temperature is gradually raised to about 800° C., while excluding air, and maintained at about 800° C. for ½ hour. During this time sulfur is evolved, escapes and is collected for re-use. The temperature is then allowed to drop to about 500° C. and held at about 500° C. for 3 hours, while introducing a mixture of air and sulfur dioxide.

The calcined product is discharged into water, washed by decantation until substantially free of water soluble salts, wet-milled in a porcelain ball mill, filtered, washed and dried.

Example 3

Fifty-five pounds of the zeolite of Example 1, twenty pounds of commercial sodium acetate, seventy-eight pounds of finely ground elemental sulfur and 1.5 pounds of sodium resinate are mixed in a porcelain ball mill for about 3 hours and then charged into a muffle furnace at a temperature of about 500° C. The temperature is gradually raised to about 800° C., while excluding air, and maintained at about 800° C. for ½ hour. During this time sulfur is evolved, escapes and is collected for re-use. The temperature is then allowed to drop to about 500° C. and held at about 500° C. for 3 hours, while introducing a mixture of air and sulfur dioxide. The calcined product is discharged into water, washed by decantation until substantially free of water soluble salts, wet-milled in a porcelain ball mill, filtered, washed and dried.

Example 4

Fifty-five pounds of the zeolite of Example 1, 17.5 pounds of commercial sodium propionate, seventy-eight pounds of finely ground elemental sulfur and 1.5 pounds of sodium resinate are mixed in a porcelain ball mill for about 3 hours and then charged into a muffle furnace at a temperature of about 500° C. The temperature is gradually raised to about 800° C., while excluding air, and maintained at about 800° C. for ½ hour. During this time sulfur is evolved, escapes and is collected for re-use. The temperature is then allowed to drop to about 500° C. and held at about 500° C. for 3 hours, while introducing a mixture of air and sulfur dioxide. The calcined product is discharged into water, washed by decantation until substantially free of water soluble salts, wet-milled in a porcelain ball mill, filtered, washed and dried.

Example 5

Fifty-five pounds of zeolite of Example 1, 21.2 pounds of commercial sodium citrate, 78 pounds of finely ground elemental sulfur and 1.5 pounds of sodium resinate are mixed in a porcelain ball mill for about 3 hours and then charged into a muffle furnace at a temperature of about 500° C. The temperature is gradually raised to about 800° C., while excluding air, and maintained at about 800° C. for ½ hour. During this time sulfur is evolved, escapes and is collected for re-use. The temperature is then allowed to drop to about 500° C. and held at about 500° C. for 3 hours, while introducing a mixture of air and sulfur dioxide. The calcined product is discharged into water, washed by decantation until substantially free of water soluble salts, wet-milled in a porcelain ball mill, filtered, washed and dried.

Example 6

Fifty-five pounds of the zeolite of Example 1, fifty-six pounds of commercial sodium stearate and 312 pounds of finely ground elemental sulfur are mixed in a poreclain ball mill for about 3 hours and then charged into a muffle furnace at a temperature of about 500° C. The temperature is gradually raised to about 800° C., while excluding air, and maintained at about 800° C. for ½ hour. During this time sulfur is evolved, escapes and is collected for re-use. The temperature is then allowed to drop to about 500° C. and held at about 500° C. for 3 hours, while introducing a mixture of air and sulfur dioxide. The calcined product is discharged into water, washed by decantation until substantially free of water soluble salts, wet-milled in a porcelain ball mill, filtered, washed and dried.

*Example 7*

Fifty-five pounds of the zeolite of Example 1, fifteen pounds of anhydrous finely ground sodium acetate, seventy-eight pounds of finely ground elemental sulfur and 1.5 pounds of sodium resinate are mixed in a porcelain ball mill for about five hours and then charged into a clay crucible. The crucible is placed in a muffle furnace and heated to a temperature of about 850° C. for 2 hours. The crucible is then removed and allowed to cool to room temperature, after which the contents are discharged into water and washed substantially free of water soluble salts. The resulting greenish product is dried, mixed with finely ground elemental sulfur equivalent to about 7 to 10% of its weight and the mixture is charged into another clay crucible and heated to about 500° C. in a muffle furnace, in the presence of air, for about 3 hours. The resulting blue pigment is discharged from the crucible into water, washed by decantation until substantially free of water soluble salts, wet-milled in a pebble mill, filtered and dried.

*Example 8*

Two hundred twenty-six pounds of china clay is calcined for 3 hours at 700° C. and then upon cooling it is refluxed with 200 gallons of 10% KOH containing 60 pounds of diatomaceous earth for a 16-hour period. The resulting product is filtered, washed free of excess alkali and dried. Fifty-five pounds of the product from this operation are mixed with twenty pounds of potassium acetate, seventy-eight pounds of sulfur and 1.5 pounds sodium resinate in the same manner as described above. The powder is then charged into a muffle furnace at 500° C. The temperature is raised to 800° C. and held there for ½ hour after which the reduced ultramarine is cooled to 500° C. and held at this temperature for 3 hours while introducing a mixture of air and sulfur dioxide. The calcined product is discharged into water, washed by decantation until substantially free of water soluble salts, wet-milled in a porcelain ball mill, washed and dried.

*Example 9*

Two hundred twenty-six pounds of kaolin is calcined for one hour at 800° C. and then upon cooling it is discharged into a suitable container and refluxed with 200 gallons of 10% LiOH solution for 14 hours. The resulting product is then washed free of excess alkali and dried. Fifty-five pounds of product from this operation are mixed in a drum with twenty pounds lithium citrate, seventy-eight pounds powdered sulfur and 1.5 sodium resinate for two hours. Subsequent treatment is continued by charging the powder into a muffle furnace at 500° C. The temperature is raised to 800° C. and held there for ½ hour after which the reduced ultramarine is cooled to 500° C. and held at this temperature for 3 hours while introducing a mixture of air and sulfur dioxide. The calcined product is discharged into water, washed by decantation until substantially free of water soluble salts, wet-milled in a porcelain ball mil, washed and dried.

*Example 10*

A mix is made which contains 27.5 pounds of silica, 20 pounds of sodium aluminate (90% grade) 15 pounds anhydrous sodium acetate, 1.5 pounds tall oil soap, and 78 pounds of sulfur by tumbling in a porcelain mill for a 3-hour period. The resulting powder is then charged into a muffle furnace at a temperature of about 500° C. The temperature is gradually raised to 850° C. while excluding air and maintained at about 850° C. for 45 minutes. During this time sulfur is evolved, escapes and is collected for re-use. The temperature is then allowed to drop to about 500° C. and held at about 500° C. for 3 hours, while introducing a mixture of air and sulfur dioxide. The calcined product is discharged into water, washed by decantation until substantially free of water soluble salts, wet-milled in a porcelain ball mill, filtered, washed and dried.

Obviously many variations may be introduced into the production of ultramarine within the spirit of my disclosure and it is to be understood that my invention is limited only by the scope of the claims that follow.

I claim:

1. The method of producing ultramarine which comprises heating a mixture in proportions sufficient to produce an ultramarine blue, of sulfur, an alkali metal salt of an aliphatic carboxy acid and clay with the exclusion of air at a temperature of the order of 600° to 900° C. for twenty minutes to three hours, changing the ambient atmosphere to oxidizing conditions at a temperature of the order of 475° to 600° C. for one-half to three hours, and cooling, washing and grinding the resultant product.

2. The method of producing ultramarine which comprises heating a mixture in proportions sufficient to produce an ultramarine blue, of sulfur, an alkali metal salt of an aliphatic carboxy acid and a zeolite in a reducing atmosphere at a temperature of the order of 750° to 900° C. for at least one hour, changing the ambient atmosphere to oxidizing conditions and continuing the heating under oxidizing conditions at a temperature of the order of 450° to 900° C. for at least one hour and cooling, washing and grinding the resultant product.

3. The method of producing ultramarine which comprises heating a mixture in proportions sufficient to produce an ultramarine blue, of sulfur, an alkali metal salt of an aliphatic carboxy acid and clay in a reducing atmosphere at a temperature of 750° to 900° C. for twenty minutes to three hours, changing the ambient atmosphere to oxidizing conditions and continuing the heating under oxidizing conditions at a temperature of the order of 475° to 600° C. for one-half to three hours, and cooling, washing and grinding the resultant product.

4. The method of producing ultramarine which comprises heating a mixture in proportions sufficient to produce an ultramarine blue, of sulfur, an alkali metal salt of an aliphatic carboxy acid and a zeolite with the exclusion of air at a temperature of 750° to 900° C. for at least one hour, changing the ambient atmosphere to oxidizing conditions and continuing the heating under oxidizing conditions and in the presence of oxides of sulfur at a temperature between 500° and 600° C. for at least one hour and cooling the resultant product.

5. The method of producing ultramarine which comprises heating a mixture in proportions sufficient to produce an ultramarine blue, of sulfur, an alkali metal salt of an aliphatic carboxy acid and an alumino-silicate with the exclusion of air at a temperature of the order of 750° to 900° C.

for twenty minutes to three hours, changing the ambient atmosphere to oxidizing conditions and continuing the heating under oxidizing conditions at a temperature of the order of 450° to 900° C. for a further period of time and cooling the resultant product.

6. The method of producing ultramarine which comprises heating a mixture in proportions sufficient to produce an ultramarine blue, of sulfur, an alkali metal salt of an aliphatic carboxy acid and an alumino-silicate with the exclusion of air at a temperature of the order of 750° to 900° C. for twenty minutes to three hours, changing the ambient atmosphere to oxidizing conditions and continuing the heating under oxidizing conditions at a temperature of the order of 450° to 900° C. for one-half to three hours and cooling, washing and grinding the resultant product.

7. The method of producing ultramarine which comprises heating a mixture in proportions sufficient to produce an ultramarine, of sulfur, an alkali metal salt of an aliphatic carboxy acid and a zeolite in a reducing atmosphere at a temperature about 850° C. for twenty minutes to three hours, changing the ambient atmosphere to oxidizing conditions and continuing the heating under oxidizing conditions at a temperature of the order of 450° to 900° C. for at least one hour, and cooling, washing and grinding the resultant product.

8. The method of producing ultramarine which comprises heating a mixture in proportions sufficient to produce an ultramarine blue, of sulfur, an alkali metal salt of an aliphatic carboxy acid and an alumino-silicate in a reducing atmosphere at a temperature of the order of 750° to 900° C. for at least one hour, changing the ambient atmosphere to oxidizing conditions and continuing the heating under oxidizing conditions, and in the presence of oxides of sulfur at a temperature of the order of 475° to 600° C. for one-half to three hours and cooling the resultant product.

9. The method of producing ultramarine which comprises heating a mixture in proportions sufficient to produce an ultramarine blue, of sulfur, an alkali metal salt of an aliphatic carboxy acid and an alumino-silicate with the exclusion of air at a temperature of 750° to 900° C. for at least one hour, changing the ambient atmosphere to oxidizing conditions and continuing the heating under oxidizing conditions and in the presence of oxides of sulfur at a temperature between 500° and 600° C. for at least one hour and cooling, washing and grinding the resultant product.

10. The method of producing ultramarine which comprises heating a mixture in proportions sufficient to produce an ultramarine blue, of sulfur, an alkali metal salt of an aliphatic carboxy acid and a zeolite with the exclusion of air at a temperature of the order of 750° to 900° C. for twenty minutes to three hours, changing the ambient atmosphere to oxidizing conditions and continuing the heating under oxidizing conditions at a temperature of the order of 475° to 600° C. for one-half to three hours and cooling, washing and grinding the resultant product.

11. The method of producing ultramarine which comprises heating a mixture in proportions sufficient to produce an ultramarine blue, of sulfur, an alkali metal salt of an aliphatic carboxy acid and clay in a reducing atmosphere at a temperature of the order of 750° to 900° C. for at least one hour, changing the ambient atmosphere to oxidizing conditions and continuing the heating under oxidizing conditions and in the presence of oxides of sulfur at a temperature of the order of 450° to 900° C. for a further period of time and cooling the resultant product.

12. The improvement in the process of producing ultramarine blue, comprising intimately mixing in proportions sufficient to produce an ultramarine blue, a sodium salt of an aliphatic carboxy acid, sulfur and an alumino-silicate, adding up to 5 per cent of a polar-non-polar compound selected from the group consisting of alkali metal resinates, alkali metal soaps, and alkali metal salts of a lignin sulfonic acid, heating in a reducing atmosphere at a temperature of the order of 600° to 900° C. for at least twenty minutes and changing the ambient atmosphere to oxidizing conditions at a temperature of 475°–600° C for a further period of time.

13. Process according to claim 12 wherein the polar-non-polar compound is sodium lignin sulfonic acid.

14. Process according to claim 12 wherein the compound is sodium resinate.

15. Ultramarine produced by heating a mixture in proportions sufficient to produce an ultramarine blue, of sulfur, an alkali metal salt of an aliphatic carboxy acid and alumino-silicate with the exclusion of air at a temperature of the order of 600° to 900° C. for twenty minutes to three hours, changing the ambient atmosphere to oxidizing conditions at a temperature of the order of 475° to 600° C. for one-half to three hours, and cooling, washing and grinding the resultant product.

CHARLES A. KUMINS.

REFERENCES CITED

The following references are of record in the file of this patent:

FOREIGN PATENTS

| Number | Country | Date |
|---|---|---|
| 146,402 | Great Britain | of 1920 |